United States Patent
Nygren et al.

(10) Patent No.: US 12,216,441 B2
(45) Date of Patent: Feb. 4, 2025

(54) METHOD FOR TRANSFORMING PRODUCTION FLOW DATA TO HUMAN MACHINE INTERFACE DATA, AND A SYSTEM

(71) Applicant: Tetra Laval Holdings & Finance S.A., Pully (CH)

(72) Inventors: Sebastian Nygren, Arlöv (SE); Mattias Abrahamsson, Annelöv (SE); Rickard Moberg, Teckomatorp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 18/569,969

(22) PCT Filed: Apr. 27, 2022

(86) PCT No.: PCT/EP2022/061219
§ 371 (c)(1),
(2) Date: Dec. 13, 2023

(87) PCT Pub. No.: WO2022/263045
PCT Pub. Date: Dec. 22, 2022

(65) Prior Publication Data
US 2024/0272599 A1    Aug. 15, 2024

(30) Foreign Application Priority Data

Jun. 15, 2021 (EP) .................................. 21179388

(51) Int. Cl.
G05B 19/042    (2006.01)

(52) U.S. Cl.
CPC .................. *G05B 19/0423* (2013.01); *G05B 2219/23258* (2013.01)

(58) Field of Classification Search
CPC .................. G05B 19/0423; G05B 2219/23258
See application file for complete search history.

(56) References Cited

U.S. PATENT DOCUMENTS

2021/0096523 A1*    4/2021    Stump .................... G06N 20/00

FOREIGN PATENT DOCUMENTS

EP    3098764 A1    11/2016

OTHER PUBLICATIONS

Moussa et al., "A model-based approach to semi-automated user interface generation for process control interactive applications" Interacting with Computers, Jan. 1, 2000, vol. 12, No. 3, pp. 245-279.

(Continued)

*Primary Examiner* — Charles R Kasenge
(74) *Attorney, Agent, or Firm* — Knobbe, Martens, Olson, & Bear, LLP

(57) ABSTRACT

A method for transforming production flow data into human machine interface data is presented. The PF data comprises storage objects and processing objects. The method comprises receiving the PF data, identifying the storage objects and the processing objects in the PF data, for each processing object, identifying source objects, identifying destination objects, forming a number of process sequences based on the PF data, identifying linking objects present in two or more of the process sequences, generating an aggregated process sequence, and generating the HMI data based on the aggregated process sequence, such that the HMI data can generate a rectangular array, wherein a visually represented destination object of the destination object is placed subsequent to a visually represented source object of the source object for each of the process sequences in the first direction in the rectangular array.

8 Claims, 4 Drawing Sheets

(56) References Cited

OTHER PUBLICATIONS

Sebestyen et al., "Supervisory Control and Quality Assurance in Food Industry" Aug. 2008 IEEE International Conference on Automation, Quality and Testing, Robotics in 5 pp.
Extended European Seach Report received in Application No. 22170260.8 dated Oct. 18, 2022.
Intent To Grant received in European Application No. 22170260.8 dated Oct. 6, 2023.
International Search Report and Written Opinion in International Application PCT/EP2022061219 mailed on Aug. 12, 2022.

* cited by examiner

METHOD FOR TRANSFORMING PRODUCTION FLOW DATA TO HUMAN MACHINE INTERFACE DATA, AND A SYSTEM

TECHNICAL FIELD

The invention relates to methods and systems for controlling food processing lines. More particularly, it is related to a method for transforming production flow data to human machine interface data, and a system comprising a food processing line, an operator display and a control unit.

BACKGROUND ART

Food processing lines of today are most often built such that these can be adapted in different ways to meet different product properties or to produce different kinds of products. Having processing lines configured to meet a large variety of conditions and requirements comes with the cost that the food processing lines are often complex. In addition to being complex, it is generally so that most processing lines are different from one another. One reason for this may be that the food processing lines have been upgraded over time. The complexity in combination with that many food processing lines are unique in their composition results in that it is generally a difficult task for an operator to control the operation of a food processing line, in particular in case he or she has no or little experience from handling the specific food processing line he or she is responsible for.

To have a better understanding of the food processing line and to be able to monitor progression of the food processing, different SCADA (Supervisory Control And Data Acquisition) systems have been developed. Even though these systems reduce the burden on the operator being in charge of the control of the food processing line, setting up and implementing new systems are generally time-consuming. Further, even when the system is set up, it may still be challenging for a new operator to understand how to interpret the information presented via an operator display. The SCADA systems may namely be set up in different ways and the information can be conveyed to the operator in different ways. Even though this flexibility comes with the advantage that the systems can be customized, the drawback is that a new operator may need time to acquaint himself or herself with the system.

Even though present SCADA systems provide information about the food processing line to the operator, setting up such system require an investment, both in money and time. In addition to the time and money needed for setting up the systems, most systems can be set up in accordance with the specific needs of the operator, which is advantageous in many ways, but also poses a risk that a new operator has difficulties in understanding the information provided, and as an effect, the food processing line may be controlled in a non-optimal manner.

SUMMARY

It is an object of the invention to at least partly overcome one or more of the above-identified limitations of the prior art. In particular, it is an object to provide a time-efficient procedure for setting up a control system for a food processing line. Another object is to assure that the information is represented consistently for different food processing lines, which reduces the risk for operator mistakes.

According to a first aspect it is provided a method for transforming production flow (PF) data into human machine interface (HMI) data, wherein the PF data may comprise storage objects representing storage units of a food processing line, and processing objects representing processing units of the food processing line, said method comprising receiving the PF data, identifying the storage objects and the processing objects in the PF data, for each processing object, identifying source objects for the processing object among the storage objects and the processing objects, identifying destination objects for the processing object among the storage objects and the processing objects, forming a number of process sequences based on the PF data, wherein each process sequence may comprise a process sequence specific source object and a process sequence specific destination object, identifying linking objects present in two or more of the process sequences, generating an aggregated process sequence by linking the process sequences together via the linking objects, and generating the HMI data based on the aggregated process sequence, such that the HMI data once executed on an operator display, may generate a rectangular array of screen area elements arranged in a first direction (A), wherein a visually represented destination object of the destination object may be placed subsequent to a visually represented source object of the source object for each of the process sequences in the first direction A in the rectangular array.

By having this structured approach, HMI data may be generated in a time efficient manner and the time and cost for setting up food processing line or to upgrade a food processing line can be reduced. In addition, by having the structured approach described above, the food processing line, even though being very complex, can be consistently translated into a user interface that is due to its consistency intuitive to operators and other personnel. One reason for making it possible to handle complex processing lines is that each processing object is analyzed individually and that the results of these individual assessments are thereafter aggregated.

The rectangular array of the screen area elements may be arranged in the first direction A and a second direction B, wherein visually represented processing objects of the processing objects may be placed subsequent to visually represented storage objects of the storage objects in the second direction B in the rectangular array.

An advantage of distinguishing storage objects from processing objects on the operator display is that the operator can more easily grasp how the different units of the food processing line are connected to each other.

The processing objects may comprise a first type processing object and a second type processing object, and the visually represented processing objects may comprise a visually represented first type processing object and a visually represented second type processing object, linked to the first type processing object and the second type processing object, respectively, wherein the visually represented second type processing object may be placed subsequent to the visually represented first type processing object in the second direction B in the rectangular array.

An advantage with separating different types of processing objects in the second direction B is that the operator can easier grasp how the food processing line is designed and how different food processing objects relate to one another.

The processing units may be chosen from a group comprising of temperature treatment apparatuses, homogenizers, separators, filter apparatuses, mixers, cheese vats, ice cream freezers, ice cream extruders, powder dryers and packaging machines.

The storage units may be tanks.

Degrees of filling of the storage units may be determined, and the degrees of filling may be displayed in the visually represented storage objects.

Inventory of the food processing line may be determined based on the degrees of filing of the storage units, and the inventory of the food processing line may be displayed together with the visually represented storage objects.

According to a second aspect it is provided a system comprising a food processing line, an operator display and a control unit configured to transform production flow (PF) data into human machine interface (HMI) data. The PF data may comprise storage objects representing storage units of the food processing line, and processing objects representing processing units of the food processing line. The control unit may comprise a PF data receiver configured to receive the PF data, a storage and processing object identifier configured to identify the storage objects and the processing objects in the PF data, a source object identifier configured that for each processing object identify source objects for the processing object among the storage objects and the processing objects, a destination object identifier configured to identify destination objects for the processing object among the storage objects and the processing objects, a process sequence former configured to form a number of process sequences based on the PF data, wherein each process sequence comprises a process sequence specific source object and a process sequence specific destination object, a linking object identifier configured to identify linking objects present in two or more of the process sequences, an aggregated process sequence generator configured to generate an aggregated process sequence by linking the process sequences together via the linking objects, and an HMI data generator configured to generate the HMI data based on the aggregated process sequence, such that the HMI data once executed on an operator display, generates a rectangular array of screen area elements arranged in a first direction A and a second direction B, wherein a visually represented destination object of the destination object may be placed subsequent to a visually represented source object of the source object for each of the process sequences in the first direction A in the rectangular array.

Visually represented processing objects of the processing objects may be placed subsequent to visually represented storage objects of the storage objects in the second direction B in the rectangular array.

The processing objects may comprise a first type processing object and a second type processing object, and the visually represented processing objects may comprise a visually represented first type processing object and a visually represented second type processing object, linked to the first type processing object and the second type processing object, respectively, wherein the visually represented second type processing object is placed subsequent to the visually represented first type processing object in the second direction B in the rectangular array.

The processing units may be chosen from a group comprising of temperature treatment apparatuses, homogenizers, separators, filter apparatuses, mixers, cheese vats, ice cream freezers, ice cream extruders, powder dryers and packaging machines.

The storage units may be tanks.

The features and advantages presented with respect to the first aspect also apply to the second aspect.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
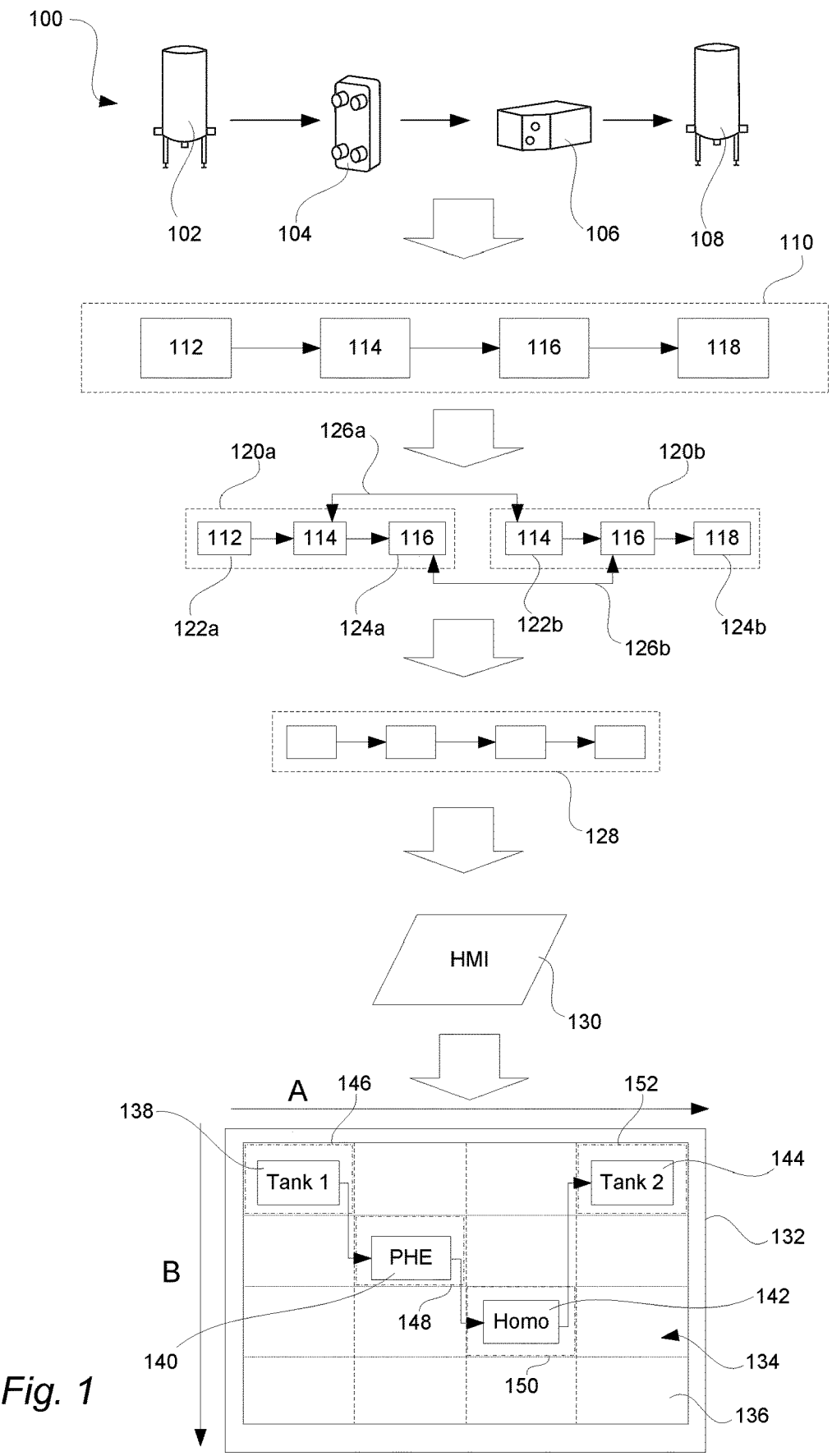
FIG. 1 illustrates generally how production flow (PF) data is transformed into Human Machine Interface (HMI) data.

With reference to FIG. 1 it is provided by way of example a general illustration on how information generated by the food processing line 100 can be transformed such that an operator gain access to the current status of the food processing line 100 via an operator display 132.

As illustrated, the food processing line 100 comprises a number of storage units 102, 108 and a number of processing units 104, 106. In the example illustrated, the storage units 102, 108 are a first tank 102 and a second tank 108, and the processing units 104, 106 are a plate heat exchanger 104 and a homogenizer 106. The first tank 102 is arranged to feed food product to the plate heat exchanger 104. From the plate heat exchanger 104, the food product is, after being temperature treated, fed to a homogenizer 106, in which the food product can be treated in that fat globules are disrupted. After being homogenized, the food product is fed to the second tank 108.

During production, production flow (PF) data 110 is generated by the food processing line 100. This data may e.g. comprise data generated from valve arrangements, flow sensors, level sensors and/or pressure sensors. This data may be generated by the different storage units and processing units themselves via built-in sensors and/or the data may be generated by sensors being external units, e.g. placed between two different processing units. The PF data 100 may be transferred via data communications modules included in the different food processing units 104, 106, in the storage units 102, 108 and/or in the valve arrangements (not illustrated) directly, or as an alternative the PF data may be transferred via data communications modules shared by several storage units 102, 108, processing units 104, 106 and/or the valve arrangements.

The food processing line 100 can be reflected in the PF data 110. For instance, the first tank 102 may be represented as a first storage object 112, the first processing unit 104 may be represented as a first processing object 114, the second processing unit 106 may be represented as a second processing object 116, and the second tank 108 may be represented as a second storage object 118.

After having identified the storage objects and processing objects in the PF data 110, the PF data 110 is processed in that for each processing object 114, 116, a source object for the processing object can be identified, and also in that a destination object for the processing object can be identified. Put differently, for each processing object, it can be determined from which processing object or storage object the food product is fed, and also to which processing object or storage object the food product is fed. After having identified the source object and the destination object, a process sequence 120a-b can be formed. The process sequence 120a-b can comprise a process sequence specific source object 122a-b and a process sequence specific destination object 124a-b. Even though the example illustrated comprises two process sequences placed in sequence, the approach can also be used for process sequences in parallel as well as complex set ups comprising several process sequences placed in sequence and several process sequences placed in parallel.

As illustrated, a processing object and/or a storage object may form part of more than one process sequence 120a-b. For example, as illustrated, the processing objects 114, 116 may form part of the two process sequence 120a-b illustrated. The processing objects 114, 116 and/or storage objects 112, 118 forming part of more than one process sequence 120a-b, may be identified as linking objects 126a-b. By using these linking objects 126a-b, the process sequences 120a-b linked via the linking objects 126a-b may be combined into an aggregated process sequence 128.

Once having the aggregated process sequence 128 generated, Human Machine Interface (HMI) data 130 may be generated based on the aggregated process sequence. By having the aggregated process sequence 128 generated in a structured manner by identifying source objects and destination objects for each of the processing objects, it is made possible to generate the HMI data 130 such that the food processing line 100 is reflected in a consistent manner on the operator display 132. This is advantageous in that the operator can easily navigate himself or herself, thereby easily grasp the information provided, which in turn results in that decisions can be made quicker and also with less risk that the decisions made are based on misinterpretations of the information provided via the operator display 132.

The HMI data 130, once received by the operator display 132, can be transformed into graphical objects provided in a rectangular array 134 having a plurality of screen area elements 136 and extending in a first and a second direction A, B. As illustrated, the first storage object 112, herein also the first process sequence specific source object 122a, can be represented by a first visually represented source object 138, and the first processing object 114, herein also the second process sequence specific source object 122b, can be represented by a second visually represented source object 140. The second processing object 116, herein also the first process sequence specific destination object 124a, can be represented by a first visually represented destination object 142, and the second storage object 118, herein also the second process sequence specific destination object 124b, can be represented by a second visually represented destination object 144. To convey information to the operator in a way that reduces the risk for misinterpretation, the way how the food product can flow through the food processing line 100 can be represented by that the visually represented destination object 142, 144 of the destination object 116, 118 can be placed subsequent to a visually represented source object 138, 140 of the source object 112, 114 for each of the process sequences 120a-b in the first direction A in the rectangular array 134. As illustrated, in the example presented, the first visually represented destination object 142 can be placed to the right of the first visually represented source object 138, i.e. subsequent in the first direction A extending from left to right, and the second visually represented destination object 144 can be placed to the right of the second visually represented source object 140.

Further, to provide the possibility for the operator to easily distinguish the visually represented processing objects 140, 142 of the processing objects 114, 116 from the visually represented storage objects 138, 144 of the storage objects 112, 118, the visually represented processing objects 140, 142 may be placed subsequent to the visually represented storage objects 138, 144 in the second direction B in the rectangular array 134. In this particular example, this approach results in that the second visually represented source object 140 and the first visually represented destination object 142 is placed below the first visually represented source object 138 and the second visually represented destination object 144.

The processing objects 114, 116 may comprise a first type processing object 114, exemplified in FIG. 1 by a plate heat exchanger, and a second type processing object 116, exemplified by a homogenizer. As an effect of the that there may be different types of processing objects, the visually represented processing objects 140, 142 may comprise a visually represented first type processing object 140 and a visually represented second type processing object 142, linked to the first type processing object 114 and the second type processing object 116, respectively. To provide for that the operator easily can identify that different types of processing objects, the visually represented second type processing object 142 can be placed subsequent to the visually represented first type processing object 140 in the second direction B in the rectangular array 134.

The operator display 132 may be a touch screen. Touch screen enabled area elements 146, 148, 150, 152 may be provided such that once the operator touches the visually represented source objects or destination objects 138, 140, 142, 144, additional information about the chosen object is provided.

Figure 2:
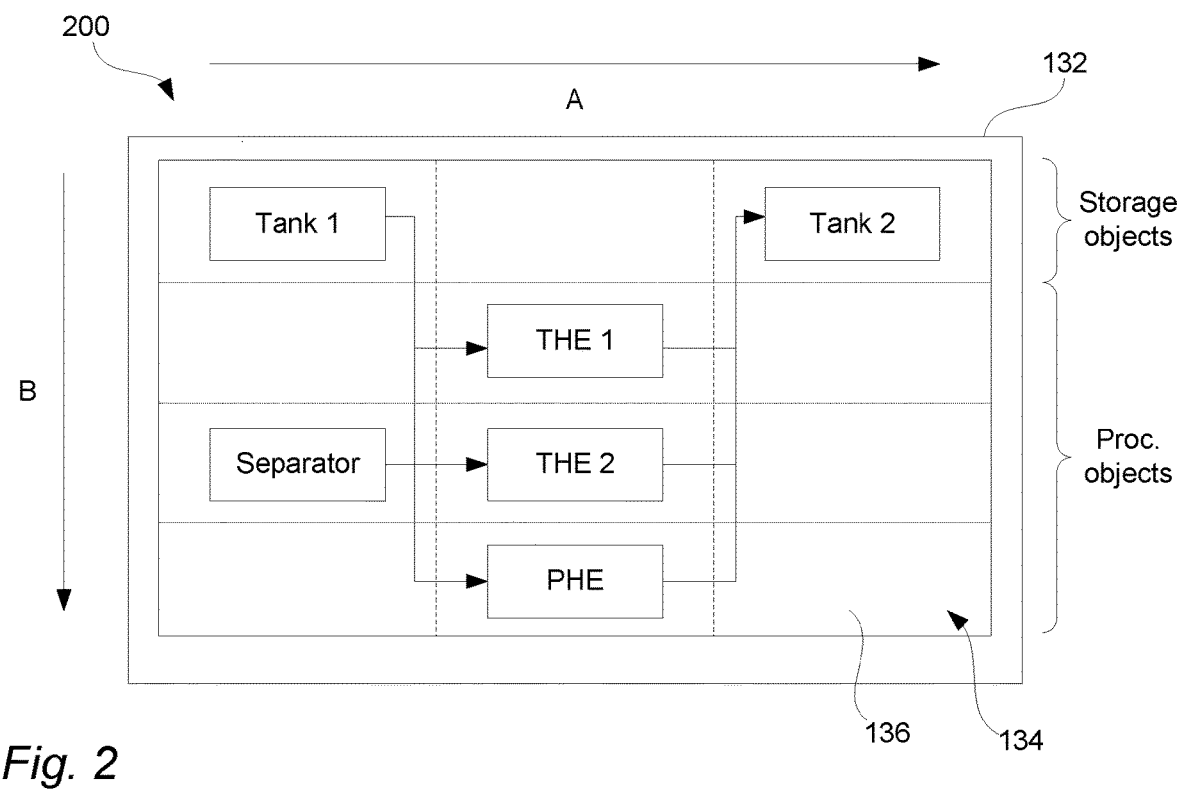
FIG. 2 illustrates an example of how a food processing line can be displayed on an operator display.

FIG. 2 illustrates an example 200 of how a more complex food processing line can be displayed on the operator display 132. Similar to the food processing line 100 illustrated in FIG. 1, the food processing line visualized in the operator panel 132, as illustrated in FIG. 2, comprises a first and a second tank. However, unlike the example illustrated in FIG. 1, one of the processing objects—"Separator"—is set as process sequence specific source object and thus placed to the left in the rectangular array 134. Also unlike the example illustrated in FIG. 1, there are visualized three parallel processing objects—"THE 1", "THE 2" and "PHE"—that are all arranged to receive food product from "Tank 1" or "Separator". By using the approach described above, that is, identifying the process sequences 120a-b and the process sequence specific source objects 122a-b, and generating the aggregated process sequence 128 based on these, parallel arrangements as illustrated in FIG. 2 can be identified efficiently such that the HMI data 130 can be generated consistently.

Figure 3:
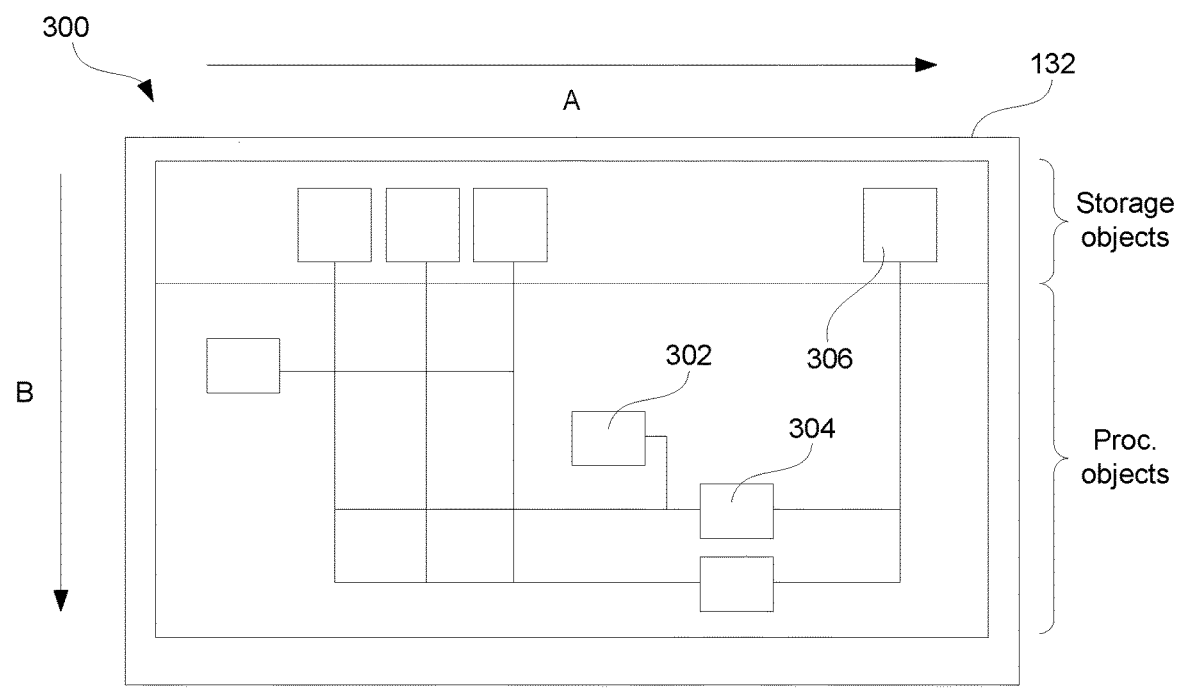
FIG. 3 illustrates another example of how a food processing line can be displayed on an operator display.

FIG. 3 illustrates yet another example of how a food processing line can be visualized on the operator display 132. In this particular example, four storage objects are visualized. Further, in this particular example, a third processing object 302 forms the process specific source object of the process sequence for a fourth processing object 304, placed subsequent to the third processing object 302 in the first direction A, and the third storage object 306 may form the process specific destination object for this process sequence. Since the third processing object 302 does not constitute a process specific destination object for any other process sequence, the third processing object 302 may be provided with only one connection, as illustrated.

Figure 4:
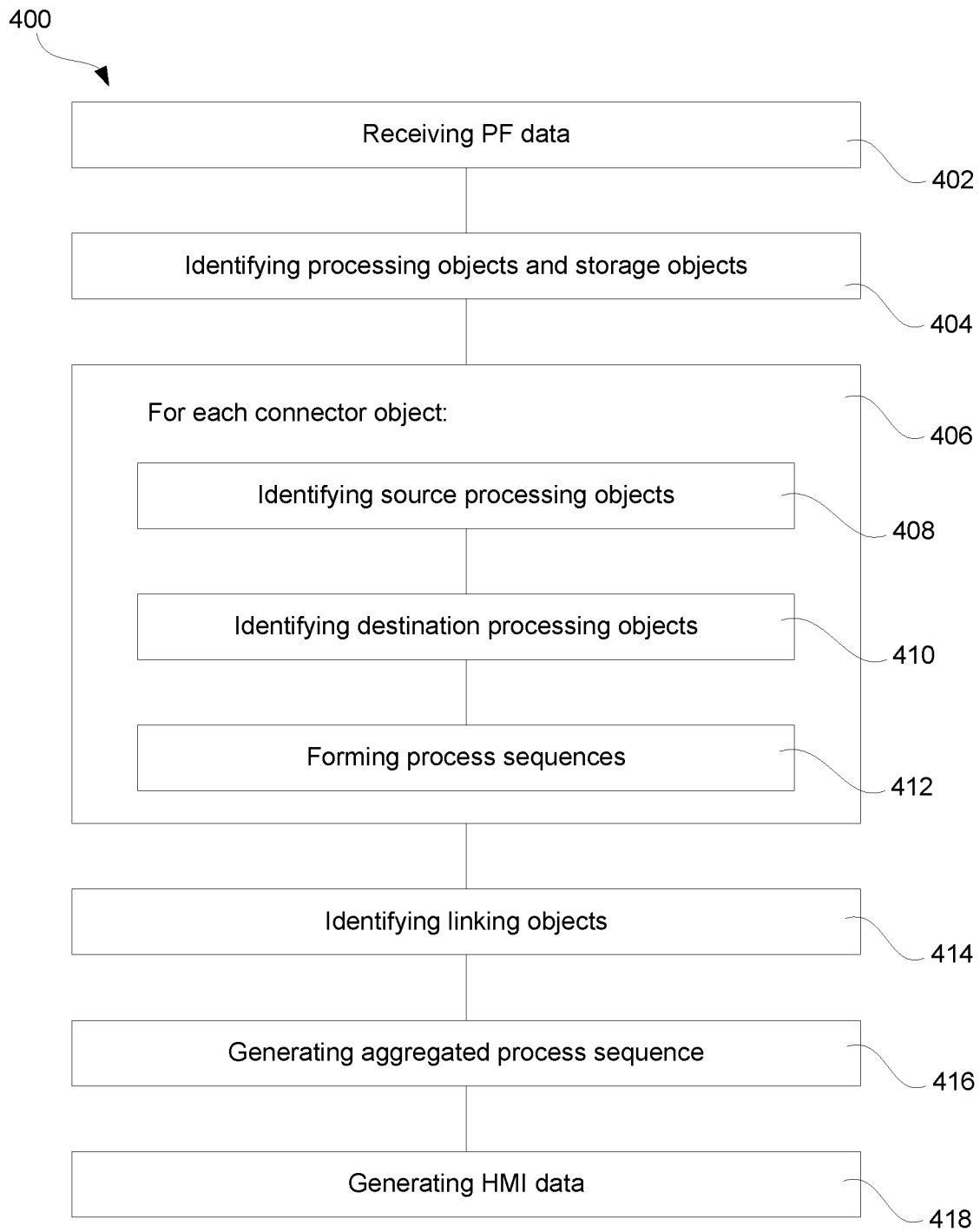
FIG. 4 is a flowchart illustrating steps of a method for transforming the PF data 110 into the HMI data 130.

FIG. 4 is a flowchart illustrating a method 400 for transforming the PF data 110 into the HMI data 130. In a first step 402, the PF data 110 can be received. Thereafter, in a second step 404, the storage objects 112, 118 and the processing objects 114, 116 in the PF data 110 can be identified. In a third step 406, for each processing object 114, 116, the source objects 112, 114 for the processing object 114, 116 can be identified among the storage objects 112, 118 and the processing objects 114, 116 in a first sub-step 408. Thereafter, the destination objects 116, 118 for the processing object 114, 116 can be identified among the storage objects 112, 118 and the processing objects 114, 116 in a second sub-step 410. In a third sub-step 412, a number of process sequences 120a-b can be formed based on the PF data 110, wherein each process sequence comprises a process sequence specific source object 122a-b and a process sequence specific destination object 124a-b.

In a fourth step 414, the linking objects 126a-b present in two or more of the process sequences 120a-b can be identified.

In a fifth step 416, the aggregated process sequence 128 can be generated by linking the process sequences 120a-b together via the linking objects 126a-b.

In a sixth step 416, the HMI data 130 can be generated based on the aggregated process sequence 128, such that the HMI data 130 once executed on an operator display 132, generates a rectangular array 134 of screen area elements 136 arranged in a first direction A, wherein a visually represented destination object 142, 144 of the destination object 116, 118 can be placed subsequent to a visually represented source object 138, 140 of the source object 112, 114 for each of the process sequences 120a-b in the first direction A in the rectangular array 134.

Figure 5:
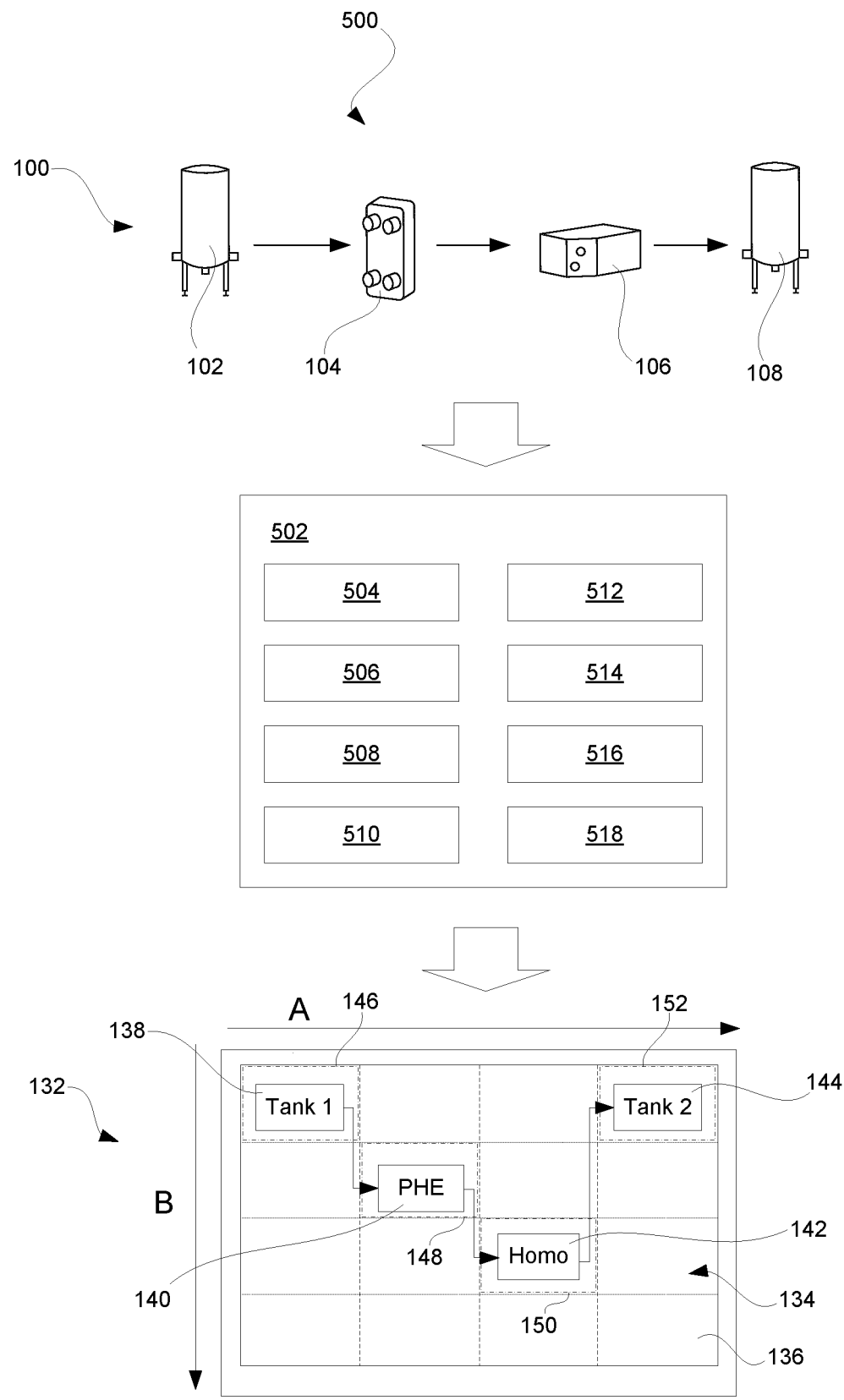
FIG. 5 generally illustrates a system comprising a food processing line, an operator display and a control unit.

FIG. 5 illustrates by way of example a system 500 comprising the food processing line 100, the operator display 132 and a control unit 502 configured to transform the PF data 110 into the HMI data 130. The control unit 502 can comprise a PF data receiver 504 configured to receive the PF data 110. Based on the received PF data, a storage and processing object identifier 506 process the PF data to identify the storage objects 112, 118 and the processing objects 114, 116 in the PF data 110. After having identified the storage objects and processing objects, a source object identifier 508 can based on this information process each processing object 114, 116 to identify source objects 112, 114 for the processing object 114, 116 among the storage objects 112, 118 and the processing objects 114, 116. In a similar manner, a destination object identifier 510 can process the data to identify destination objects 116, 118 for the processing object 114, 116 among the storage objects 112, 118 and the processing objects 114, 116. After having identified the source objects and the destination objects, a process sequence former 512 can process the data such that a number of process sequences 120a-b based on the PF data 110 are formed. After having formed a number of process sequences, each process sequence comprise a process sequence specific source object 122a-b and a process sequence specific destination object 124a-b. A linking object identifier 514 can be provided to identify linking objects 126a-b present in two or more of the process sequences 120a-b. After having identified the linking objects 126a-b, an aggregated process sequence generator 516 can be sued for generating the aggregated process sequence 128 by linking the process sequences 120a-b together via the linking objects 126a-b. Finally, after having the aggregated process sequence 128, an HMI data generator 518 can be used for generating the HMI data 130 based on the aggregated process sequence 128, such that the HMI data 130 once executed on the operator display 132, can generate a rectangular array 134 of screen area elements 136.

From the description above follows that, although various embodiments of the invention have been described and shown, the invention is not restricted thereto, but may also be embodied in other ways within the scope of the subject-matter defined in the following claims.

The invention claimed is:

1. A method for transforming production flow (PF) data into human machine interface (HMI) data, wherein the PF data comprises storage objects representing storage units of a food processing line, and processing objects representing processing units of the food processing line, wherein the processing units are selected from the group consisting of temperature treatment apparatuses, homogenizers, separators, filter apparatuses, mixers, cheese vats, ice cream freezers, ice cream extruders, powder dryers, and packaging machines, and wherein the storage units are tanks, said method comprising:
receiving the PF data,
identifying the storage objects and the processing objects in the PF data,
for each processing object,
  identifying source objects for the processing object among the storage objects and the processing objects,
  identifying destination objects for the processing object among the storage objects and the processing objects, and
  forming a number of process sequences based on the PF data, wherein each process sequence comprises a process sequence specific source object and a process sequence specific destination object,
identifying linking objects comprising at least one of the storage objects or processing objects present in two or more of the process sequences,
generating an aggregated process sequence by linking the two or more process sequences together via the linking objects, and
generating HMI data based on the aggregated process sequence, such that the HMI data once executed on an operator display, generates a rectangular array of screen area elements arranged in a first direction,
wherein a visually represented destination object of the destination object is placed subsequent to a visually represented source object of the source object for each of the process sequences in the first direction in the rectangular array.

2. The method according to claim 1, wherein the rectangular array of the screen area elements are arranged in the first direction and a second direction, wherein visually represented processing objects of the processing objects are placed subsequent to visually represented storage objects of the storage objects in the second direction in the rectangular array.

3. The method according to claim 2, wherein the processing objects comprise a first type processing object and a second type processing object, and the visually represented processing objects comprise a visually represented first type processing object and a visually represented second type processing object, linked to the first type processing object and the second type processing object, respectively, wherein the visually represented second type processing object is placed subsequent to the visually represented first type processing object in the second direction in the rectangular array.

4. The method according to claim 1, wherein degrees of filling of the storage units are determined, the degrees of filling are displayed in the visually represented storage objects.

5. The method according to claim 4, wherein inventory of the food processing line is determined based on the degrees of filing of the storage units, and the inventory of the food processing line displayed together with the visually represented storage objects.

6. A system comprising:
a food processing line;
an operator display; and
a control unit configured to transform production flow (PF) data into human machine interface (HMI) data, wherein the PF data comprises storage objects representing storage units of the food processing line, and processing objects representing processing units of the food processing line, wherein the processing units are selected from the group consisting of temperature treatment apparatuses, homogenizers, separators, filter apparatuses, mixers, cheese vats, ice cream freezers, ice cream extruders, powder dryers, and packaging machines, and wherein the storage units are tanks, said control unit comprising:
a PF data receiver configured to receive the PF data,
a storage and processing object identifier configured to identify the storage objects and the processing objects in the PF data,
a source object identifier configured that for each processing object identify source objects for the processing object among the storage objects and the processing objects,
a destination object identifier configured to identify destination objects for the processing object among the storage objects and the processing objects,
a process sequence former configured to form a number of process sequences based on the PF data, wherein each process sequence comprises a process sequence specific source object and a process sequence specific destination object,
a linking object identifier configured to identify linking objects comprising at least one of the storage objects or processing objects present in two or more of the process sequences,
an aggregated process sequence generator configured to generate an aggregated process sequence by linking the two or more process sequences together via the linking objects, and
an HMI data generator configured to generate HMI data based on the aggregated process sequence, such that the HMI data once executed on the operator display, generates a rectangular array of screen area elements arranged in a first direction and a second direction,
wherein a visually represented destination object of the destination object is placed subsequent to a visually represented source object of the source object for each of the process sequences in the first direction in the rectangular array.

7. The system according to claim 6, wherein visually represented processing objects of the processing objects are placed subsequent to visually represented storage objects of the storage objects in the second direction in the rectangular array.

8. The system according to claim 6, wherein the processing objects comprise a first type processing object and a second type processing object, and the visually represented processing objects comprise a visually represented first type processing object and a visually represented second type processing object, linked to the first type processing object and the second type processing object, respectively, wherein the visually represented second type processing object is placed subsequent to the visually represented first type processing object in the second direction in the rectangular array.

* * * * *